Sept. 3, 1946.   J. D. LEWIS   2,406,781
ELECTRIC MOTOR AND CONTROL SYSTEM FOR MOTORS
Filed Nov. 27, 1943   3 Sheets-Sheet 2

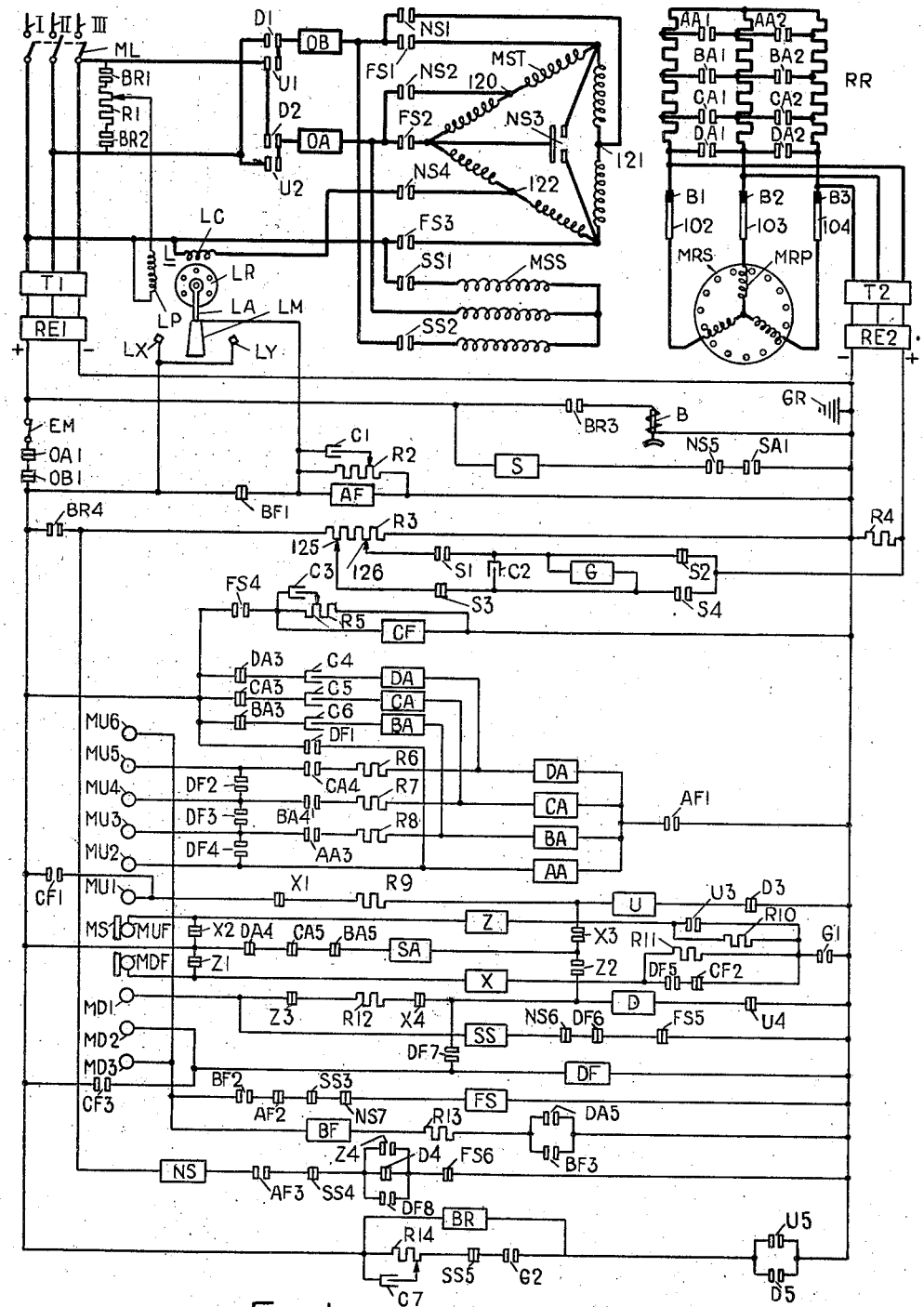
FIG. I

Jacob Daniel Lewis   INVENTOR
BY Matthew F. Bradley   ATTORNEY

Patented Sept. 3, 1946

2,406,781

UNITED STATES PATENT OFFICE 2,406,781

ELECTRIC MOTOR AND CONTROL SYSTEM FOR MOTORS

Jacob Daniel Lewis, Yonkers, N. Y., assignor to Otis Elevator Company, New York, N. Y., a corporation of New Jersey Application November 27, 1943, Serial No. 512,023

8 Claims. (Cl. 172—274)

The invention relates to control systems for motors, especially for hoists.

There are various forms of hoisting installations such as winch installations for handling ship's cargo. In transferring ship's cargo by winches, it is important that the cargo be handled rapidly and safely. In loading the ship, the cargo is lifted from the pier and lowered into the ship through hatches. In unloading, the cargo is lifted out through the hatches and lowered onto the pier. The manner in which the cargo is swung from over the hatch to the pier, or from the pier to over the hatch, depends upon the system utilized for operating the winches. There are several of these systems, such as the "burton system" and the "married-fall system." The present invention is applicable to all of these systems.

It is desirable in certain types of hoisting installations such as cargo winches that the hoisting motor may be operated at different speeds. There are certain advantages in utilizing polyphase alternating current motors as hoisting motors, especially for installations of this character.

One object of the invention is to provide a control system for hoisting motors for insuring the desired control of the operating speed for the different conditions of operation.

Another object of the invention is to provide a polyphase alternating current motor especially adapted for driving hoists such as cargo winches.

The invention will be described as applied to a cargo winch installation employing an electric hoisting motor.

In carrying out the invention as applied to such installation, three operating speeds are provided, namely, normal speed, fast speed and slow speed. The controller is arranged so that the winch may be operated at normal speed in either direction. For normal speed operation in the up direction, the torque of the motor is controllable to provide the desired lifting speed for different loads on the motor. Also the motor may be operated at fast speed in either direction when the load is below a certain amount, as for example when the hook is empty. During down operation, the motor is operated at slow speed prior to stopping from normal speed to facilitate landing the cargo. The motor cannot be operated at fast speed in either direction unless the load is below a certain amount and it cannot be operated at slow speed in the up direction. A three speed polyphase alternating current induction motor is utilized as the hoisting motor. The stator of the motor is arranged to provide excitation for three different pole numbers, one for normal speed, a second for fast speed and the remaining for slow speed. In the arrangement illustrated this is effected by providing two windings on the stator, one for a high number of poles for slow speed operation and the other arranged to provide either a number of poles for normal speed operation or a lower number of poles for fast speed operation. The rotor is provided with two windings, one a definite pitch squirrel cage winding and the other phase wound. The latter winding is wound for the number of poles of stator excitation for normal speed. It is connected through slip rings to rotor resistance which may be varied to control the torque of the motor. The pitch of the squirrel cage winding is such that it serves as the rotor winding for both fast speed stator excitation and slow speed stator excitation. The number of poles of stator excitation are so correlated that zero or negligible current flows in the phase wound rotor winding during excitation for either fast or slow speed operation and zero or negligible current flows in the squirrel cage winding during excitation for normal speed operation.

Features and advantages of the invention will be seen from the above statements and from the following specification and appended claims.

In the drawings:

Figure 1 is a simplified wiring diagram in "across-the-line" form of a motor control system, especially suitable for a cargo winch installation;

The hoisting motor is a three speed, three phase induction motor. These different speeds are obtained by exciting the stator to provide different numbers of field poles. This is effected by means of two stator windings which will be described in connection with the wiring diagram of Figure 1.

Figure 2:
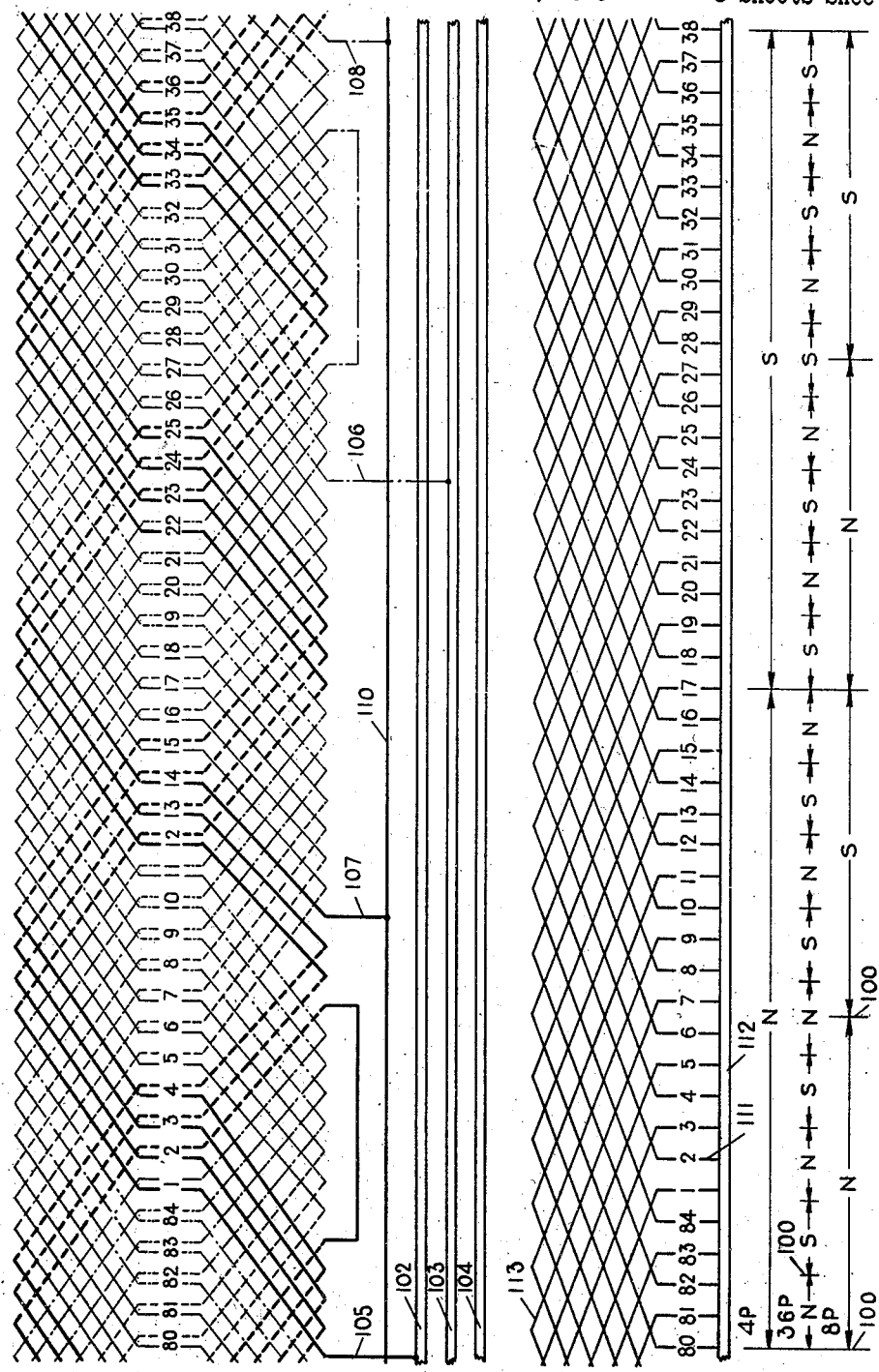
Figure 2 is a developed diagram, for half the circumference of the rotor, of the rotor windings of the motor employed in Figure 1.

Referring to Figure 2, an embodiment of the invention will be described in which the motor operates as an eight pole motor to provide normal operating speed, as a four pole motor to provide fast operating speed and a thirty-six pole motor to provide slow operating speed. The rotor is provided with two windings, one a phase wound winding shown at the top of Figure 2 and the other a squirrel cage winding shown below the phase wound winding, only half of each winding being shown. The stator poles under the different conditions of excitation are indicated at the bottom of the figure. N designates north poles while S designates south poles. The poles for the different pole numbers are represented by the spaces between the short vertical lines 100. The poles for the different excitations are indicated in three rows, the upper of which is for four pole excitation and is designated 4P, the middle of which is for thirty-six pole excitation and is designated 36P and the lower of which is for eight pole excitation and is designated 8P.

The phase wound winding of the rotor is an eight pole three phase winding illustrated as arranged in eighty-four slots, distributed in three and four slots per phase per pole. The slots are designated by numbers, namely, 1, 2, 3, etc. The phase windings are differentiated by heavy, light and dot-dash lines. Each phase winding is a wave winding of substantially full pitch, the sides of the coils being spaced ten and eleven slots. Each slot contains the conductor forming one side of one coil and the conductor forming the other side of another, the two conductors per slot being arranged one on top of the other to form a double layer winding. The phase windings are respectively connected to slip rings 102, 103 and 104 by leads 105, 106 and a lead not shown owing to the fact that only half the rotor winding is illustrated. At their other ends the phase windings are star connected as indicated by the leads 107 and 108 connected to wire 110, the lead connecting the other phase winding not being shown because of only half the rotor winding being illustrated. This phase wound winding of the rotor serves during operation of the motor on eight pole excitation.

The bars or conductors 111 of the squirrel cage winding are arranged in the same slots as the conductors of the phase wound winding, the slots being designated as above by the numbers 1, 2, 3, etc. There is one conductor per slot for the squirrel cage winding, making with the phase wound conductors a total of three conductors per slot. The squirrel cage conductors are positioned in the slots on the outside of the phase wound conductors. At one end of the rotor the squirrel cage conductors are joined to an end ring 112. At the other end of the rotor, conductors spaced twenty-one slots are connected in pairs by end connectors 113 to provide a definite pitch winding. In order to form the conductors and their end connectors as units and to provide one conductor per slot, like sides of these units are positioned in alternate slots.

The squirrel cage winding of the rotor serves during operation of the motor both on four pole and thirty-six pole excitation. By forming the coils as units, in which the conductors have end connectors with the connected conductors spaced twenty-one slots or one quarter the circumference of the rotor, with four pole excitation, i. e., a total of 720 electrical degrees these conductors are spaced 180 electrical degrees to provide a full pitch winding. This may also be seen by tracing the circuits through the conductors under the four pole excitation indicated at the bottom of the sheet. Taking the conductor in slot 2 for example, it will be seen that at the instant of excitation indicated, it is under a north pole, whereas the conductor in slot 23 to which it is joined is at a corresponding point under a south pole. Similarly, the conductors of any other connected pair have corresponding positions under opposite poles. With thirty-six pole excitation, the stator has 6480 electrical degrees so that the connected conductors are spaced 1620 electrical degrees which is the equivalent of 180 electrical degrees. Thus again, a full pitch winding is provided. This may also be seen by tracing the circuits through the conductors under the indicated thirty-six pole excitation. Taking again the conductor in slot 2, it is under a north pole whereas the conductor in slot 23 is at a corresponding point under a south pole. Likewise, the conductors of any other connected pair have corresponding positions under opposite poles. Thus, under both four pole and thirty-six pole excitations, the voltages induced in the connected conductors act cumulatively. This arrangement of connections also results in a low resistance path through the end ring under thirty-six pole excitation, whereas under four pole excitation the resistance of the end ring is high.

Inasmuch as the connected conductors of the squirrel cage winding are spaced one quarter the circumference of the rotor, they are spaced 360 electrical degrees with eight pole excitation. This may also be seen by tracing the circuits through the conductors under the eight pole excitation. Taking again the conductors in slots 2 and 23, these conductors are at corresponding points under north poles. Likewise, the conductors of any other connected pair have corresponding positions under like poles. Inasmuch as connected conductors are under the influence of like poles the voltages induced in these conductors neutralize each other. Thus, under eight pole excitation, there is no current flow in the squirrel cage winding.

Whereas there is no current flow in the squirrel cage winding with eight pole excitation, there is likewise no current flow in the phase wound winding with four pole or thirty-six pole excitation. On four pole excitation the conductors forming sides of each coil of the phase wound winding are spaced 90 electrical degrees from each other and 180 electrical degrees from the corresponding conductors of the next succeeding coil. Consequently the voltages induced in the corresponding conductors of adjacent coils neutralize each other. This may be seen by tracing the circuits through the conductors with the four pole excitation indicated. Taking the phase wound (heavy line) conductor in slot 2, since this conductor and its connected (heavy line) conductor in slot 23 are spaced 180 electrical degrees and thus are at corresponding points under north and south poles respectively, and since the circuits through these conductors are in the same direction, the voltages induced in these conductors neutralize each other. The same is true of the (heavy dotted line) conductors in slots 13 and 34. Thus, as the voltages induced in the conductors in slots 23 and 34 neutralize respectively the voltages induced in the conductors in slots 2 and 13, the resultant voltage induced in these two coils is zero. This condition is duplicated for each succeeding pair of coils so that the voltage induced in the phase wound winding during four pole excitation is zero.

Similarly, under thirty-six pole excitation, as the conductors forming the sides of each coil of the phase wound winding are spaced 1620 electrical degrees, the equivalent of 180 electrical degrees, from the corresponding conductors of the next succeeding coil, the voltages induced in these conductors neutralize each other. Thus the voltages induced in succeeding coils neutralize each other so that there is no voltage induced in the phase wound winding. This may be seen by tracing the circuits through the conductors with the thirty-six pole excitation indicated. Taking again the (heavy line) conductor in slot 2 and its connected (heavy line) conductor in slot 23, these conductors are at corresponding points under north and south poles respectively, and since the circuits through these conductors are in the same direction, the voltages induced in these conductors neutralize each other. The same is true of the (heavy dotted line) conductors in slots 13 and 34. Thus, as the voltages induced in the specified conductors neutralize each other, the resultant voltage induced in the coils formed by these conductors is zero. This condition is duplicated for each succeeding pair of coils so that the voltage induced in the phase wound winding during thirty-six pole excitation is zero.

Figure 1S:
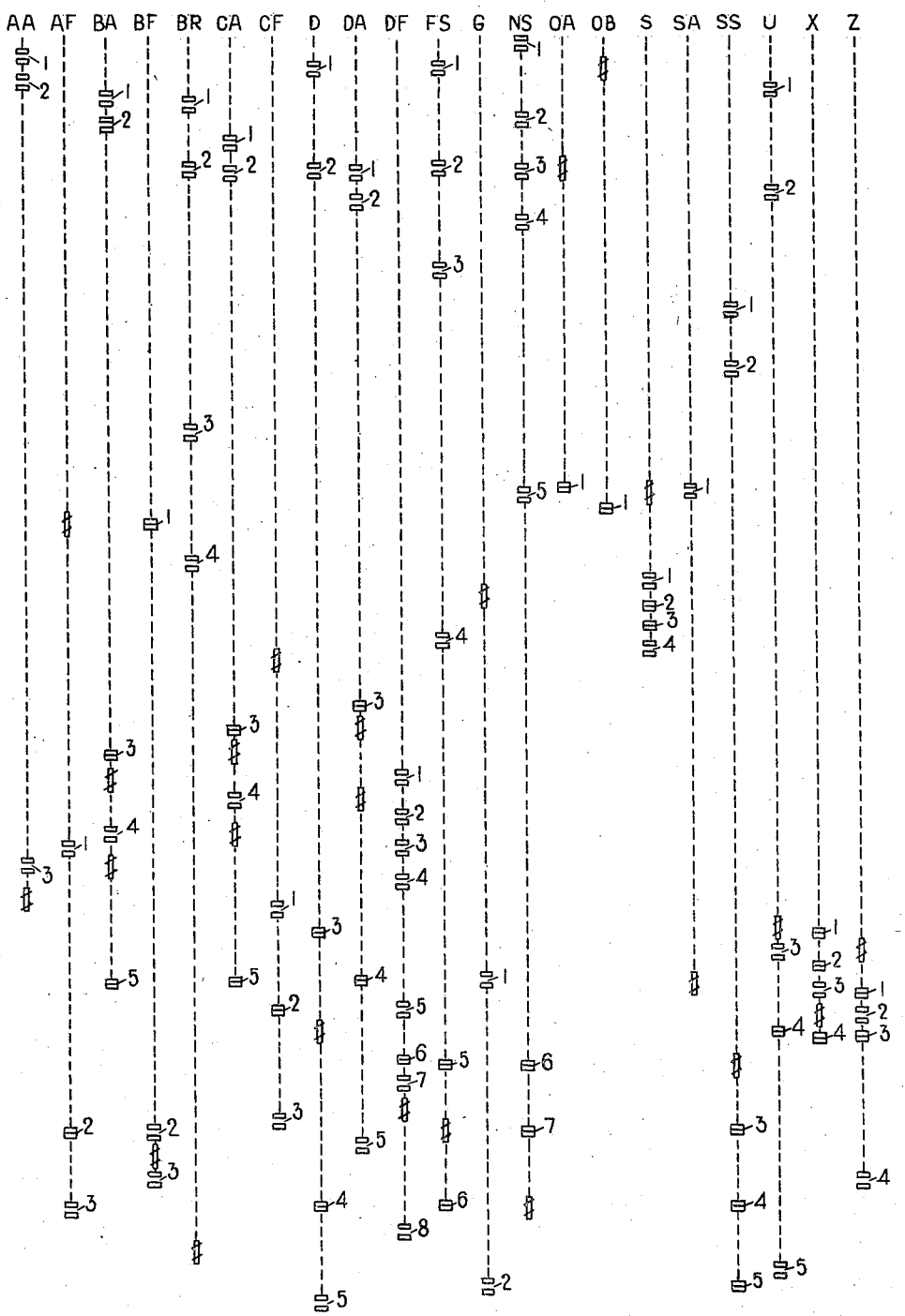
Figure 1s is a key diagram for Figure 1 showing the electromagnetic switches in spindle form with the contacts and coils arranged on the spindles in horizontal alignment with the corresponding contacts and coils in the wiring diagram.

Reference may now be had to Figure 1 which illustrates a control system for the above described motor utilized as a cargo winch motor. The circuits are shown in "straight" or "across-the-line" form in which the coils and contacts of the electromagnetic switches are separated in such manner as to render the circuits as simple and direct as possible. The relationship of these coils and contacts may be seen from Figure 1s where the switches are arranged in alphabetical order and shown in spindle form, with the coils and contacts aligned horizontally with the coils and contacts which they indicated in the wiring diagram.

The alternating current supply mains are designated I, II and III. A triple pole manually operated main line switch designated ML is provided for controlling the supply of current from the supply mains. The motor is provided with two stator windings, one a two speed winding designated MST for providing excitation for normal and fast speed operation, and the other a single speed winding designated MSS for slow speed operation. The phase wound winding of the rotor is designated MRP while the squirrel cage winding is designated MRS. The phase wound winding is connected through slip rings 102, 103 and 104 and brushes B1, B2 and B3 to star connected rotor resistances RR. Direct current for the electromagnetic control switches and release coil B of the brake is derived from the alternating current supply mains through a three phase transformer T1 and rectifier RE1. Another three phase transformer T2 is connected through brushes B1, B2 and B3 and slip rings 102, 103 and 104 to the phase wound rotor winding of the motor. A three phase rectifier RE2 is connected across the secondary of this transformer to provide direct current for controlling the operation of a governor switch. Control resistances utilized in the control system are designated generally as R and differentiated by numerals while condensers are designated generally as C and differentiated by numerals. The negative side of the feed wires to the electromagnetic switches is grounded at GR. The master control switch utilized for manually controlling the operation of the motor has its bridging segment designated MS and the stationary contacts engaged thereby designated MUF, MU1, MU2, MU3, MU4, MU5 and MU6 for up travel of the hook, and MDF, MD1, MD2 and MD3 for down travel of the hook. The segment MS is shown with its center part broken away, it being understood that it is long enough to span contacts MUF to MU6, contacts MUF and MDF being spaced so that they are the only ones engaged with the segment in off position. The emergency stop switch which is located adjacent the master controller is designated EM.

The electromagnetic switches have been designated as follows:

AA  
BA  
CA } Accelerating switches  
DA  
AF  
BF } Auxiliary fast speed switches  
CF  
BR   Brake relay  
D    Down direction switch  
DF   Down auxiliary fast speed switch  
FS   Fast speed switch  
G    Governor switch  
NS   Normal speed switch  
OA  
OB } Overload switches  
S    Governor switch relay  
SA   Auxiliary governor switch relay  
SS   Slow speed switch  
U    Up direction switch  
X  
Z } Auxiliary direction switches Throughout the description which follows, these letters will be applied to the coils of the above designated switches. Also, with reference numerals appended thereto they will be applied to the contacts of these switches, as for example U1. The electromagnetic switches are shown in deenergized condition, that is the switch contacts shown separated are those which engage when the switch is operated while those shown engaged are those which separate when the switch is operated.

In addition to the above listed switches there is a load switch designated generally by the letter L. This switch is in the form of a two phase motor operated switch. The two stator phase windings of this motor are designated LC and LP. The rotor of the motor is designated LR and is adapted to operate an arm LA on the end of which is a contact LM for engaging either of stationary contacts LX or LY. The contact arm LA is biased, as by a weight illustrated as integral with contact LM, to the position shown with contact LM intermediate the stationary contacts. The stationary contacts serve as stops to limit the amount of rotative movement of the rotor.

Assume that the hook is in a low position and that main line switch ML is closed. Under such conditions the circuit for the coil of auxiliary fast speed switch AF is completed so that contacts AF1 and AF3 are engaged and contacts AF2 are separated. To raise the hook the master switch is operated to move bridging segment MS into position to bridge one or more stationary contacts MU1, MU2, MU3, MU4, MU5 and MU6 with feed contact MUF. The engagement of segment MS with contact MU1 completes a circuit for the coil of up direction switch U. This circuit is from the positive feed line through contacts X2, feed contact MUF, contact MU1, contacts X1, resistance R9, coil of switch U, and contacts D3, to the negative feed line. Switch U, upon operation, separates interlock contacts U4 in the circuit for the coil of down direction switch D. It also engages contacts U1 and U2 to establish direction for stator winding MST of the winch motor. It also engages contacts U5 to complete a circuit for the coil of brake relay BR. Relay BR, upon operation, engages contacts BR3 to effect the energization of the release coil of the electromechanical brake B. At the same time it engages contacts BR4 completing a circuit through contacts AF3, SS4, D4 and FS6 for the coil of normal speed switch NS.

Switch NS, upon operation, engages contacts NS1, NS2, NS3 and NS4 completing a circuit for stator winding MST of the winch motor for normal speed operation. In the arrangement shown, the circuits through contacts NS1, NS2 and NS4 lead to mid points 120, 121 and 122 of the phase windings so that the two halves of each phase winding thus obtained are connected in parallel to a star point provided by the engagement of contacts NS3. The circuit from supply line I to the stator winding is through winding LC of load switch L and contacts NS4 to connection point 122. The circuit from supply line II is through contacts U2, coil of overload switch OA and contacts NS2 to connection point 120. The circuit from supply line III is through contacts U1, the coil of overload switch OB and contacts NS1 to connection point 121. This causes excitation of the stator to provide eight poles, the phase rotation of the applied voltage due to the circuits being through contacts of the up direction switch being such as to cause starting of the winch motor to lift the hook, the brake being released as the result of energization of the brake release coil.

The engagement of contacts BR4 also completes a circuit for the coil of governor switch G. This coil is subject to the voltage of the potentiometer formed by the combination of resistances R3 and R4. Resistance R3 is connected across rectifier RE1 whereas resistance R4 is connected across rectifier RE2. The voltage of rectifier RE2 is derived from the alternating current voltage of the phase wound winding MRP of the rotor which is effective on eight pole excitation. Also rectifier RE2 is connected in opposition to rectifier RE1. There are two adjustable points of connection 125 and 126 to resistance R3. The point 126 is adjusted so that the potential drop across the portion of resistance to the right of this point is neutralized by the potential drop across resistance R4 at standstill of the rotor on eight pole excitation. However, the circuit now completed for the coil of switch G is through contacts S3 and S2 to point of connection 125 on resistance R3 so that sufficient voltage is applied to the coil of switch G due to the excess potential drop across the portion of resistance R3 between points 125 and 126 to cause this switch to operate upon the starting of the motor. Switch G, upon operation, engages contacts G1 completing a circuit for the coil of auxiliary direction switch Z. This circuit is through contacts X2, coil of switch Z and contacts U3 and G1. Switch Z, upon operation, separates contacts Z1 to break the circuit to down feed contact MDF of the master switch and also separates interlock contacts Z3 in circuit for the coil of down direction switch D.

If in starting the motor master switch segment MS is moved only into engagement with contacts MU1, all of rotor resistance RR remains in circuit with the phase wound rotor winding. However, assume that the master switch segment is moved into position to connect all of the up contacts to feed contact MUF. The engagement of segment MS with contact MU2 completes a circuit through contacts AF1 for the coil of accelerating switch AA. This switch, upon operation, engages contacts AA1 and AA2 to short circuit a portion of the rotor resistance. It also engages contacts AA3 to complete a circuit for causing the operation of accelerating switch BA.

Each of accelerating switches BA, CA and DA have two coils, the lower one an operating coil and the upper one a delaying coil. With main line switch ML closed contacts AF1 are in engagement as previously set forth so that circuits are completed through condensers in series respectively with both coils of each of these accelerating switches. One circuit is through contacts BA3, condenser C6, the delaying coil of switch BA, the operating coil of the switch and contacts AF1. Another circuit is through contacts CA3, condenser C5, the delaying coil of switch CA, the operating coil of the switch and contacts AF1. The remaining circuit is through contacts DA3, condenser C4, the delaying coil of switch DA, the operating coil of the switch and contacts AF1. As a result, condensers C4, C5 and C6 are in a charged state prior to the starting of the car.

The engagement of contacts AA3 closes a circuit which connects the operating coil of switch BA to the positive feed line and which by-passes condenser C6 and the delaying coil of the switch, thereby completing a discharge circuit for the condenser. This discharge circuit is from the positive feed line through contacts BA3, condenser C6, delaying coil of switch BA, resistance R8, contacts AA3, contact MU3, bridging segment MS, feed contact MUF, contacts X2 back to the positive line. The current flow through the delaying coil of switch BA by the discharge of condenser C6 is in a direction to cause the magnetizing force of the delaying coil to oppose the magnetizing force of the operating coil of the switch. This prevents the immediate operation of switch BA. When the discharge of condenser C6 reaches a certain point switch BA operates to engage contacts BA1 and BA2. This short circuits a further portion of rotor resistance RR to increase the torque of the motor. Switch BA also separates contacts BA3 to break the circuit for the delaying coil of the switch and engages contacts BA4 to close a circuit connecting the operating coil of accelerating switch CA to the positive feed line and completing a discharge circuit for condenser C5 through the delaying coil of switch CA. The operation of switch CA is thus delayed in the same manner as described for the operation of switch BA. Upon operation, switch CA engages contacts CA1 and CA2 to short circuit a further portion of rotor resistance RR to further increase the torque of the motor. It also separates contacts CA1 to break the circuit for the delaying coil of the switch and engages contacts CA4 to cause the operation of accelerating switch DA. The operation of switch DA is similarly delayed and upon operation it engages contacts DA1 and DA2 to short circuit the remainder of the rotor resistance RR to further increase the torque of the motor and separates contacts DA3 to break the circuit for the delaying coil of the switch.

Switch DA, upon operation, also engages contacts DA5 to complete a circuit from master switch contact MU6 through resistance R13 for the coil of auxiliary fast speed switch BF. Switch BF, upon operation, engages contacts BF3 to establish a self-holding circuit. It also separates contacts BF1 rendering the coil of auxiliary fast speed switch AF subject to load switch L.

Phase winding LC of the load switch operating motor is connected in series relation in the circuit leading from supply line I to stator winding MST of the winch motor on eight pole excitation. One end of the other phase winding LP is adjustably connected to a potentiometer resistance R1 connected across supply lines II and III by the engagement of contacts BR1 and BR2. The other end of phase winding LP is connected to supply line I. The point of connection of phase winding LP to potentiometer resistance R1 is such that the current supplied to this winding is substantially in phase with the current in the phase winding LC when the winch motor is operating on eight pole excitation and is up to speed under conditions of empty hook. Under such conditions no torque is exerted by the rotor to move contact LM into engagement with either of stationary contacts LX or LY. With empty hook the rotor may act to move contact LM into engagement with one of the stationary contacts during the accelerating period owing to the fact that a certain amount of load current is drawn by the winch motor for effecting acceleration. However, as soon as the motor is up to speed, the current in winding LC returns to in phase with that in winding LP so that the load operating motor loses its torque and contact LM disengages the stationary contact.

Inasmuch as a condition has been assumed in which the hook is empty, load switch contact LM is disengaged from its stationary contacts as the motor comes up to speed so that with contacts BF1 separated the circuit for the coil of auxiliary fast speed switch AF is broken. The dropping out of switch AF is delayed by the discharge of condenser C1 to insure that the motor is up to running speed. Upon dropping out, switch AF separates contacts AF1 breaking the circuits for the coils of accelerating switches AA, BA, CA and DA and separates contacts AF3 to break the circuit for the coil of normal speed switch NS. Switch NS, upon dropping out, separates contacts NS1, NS2, NS3 and NS4 to break the circuit for stator winding MST of the driving motor. It also engages contacts NS7 completing a circuit from contact MU6 of the master control switch through contacts BF2, AF2, SS3 and NS7 for the coil of fast speed switch FS. Switch FS, upon operation, separates interlock contacts FS6 in the circuit for the coil of normal speed switch NS and engages contacts FS1, FS2 and FS3 reconnecting stator winding MST of the winch motor to the supply lines in such way that the two halves of each phase winding are connected in series, with the phase windings connected in delta relation. This causes excitation of the stator to provide four poles, which brings the motor from normal operating speed up to fast speed. The squirrel cage rotor winding is effective to provide the torque for fast speed operation. It is to be noted that the circuit from supply line I to the stator winding for fast speed operation does not include winding LC of the load switch operating motor. Thus, the load switch is not subject to the accelerating current of the winch motor in bringing the motor up to fast speed, thereby preventing the operation of the load switch to return the motor to eight pole excitation.

The load switch is adjusted as by means of its biasing weight to prevent the engagement of the movable contact LM with a stationary contact when the load on the winch is light, say below 15% of the rated load. Assume that the hook is being raised and is lifting a heavy load. Under such conditions the rotor LR of the load switch operating motor will have rotated in a certain direction assumed as clockwise to move contact LM into engagement with stationary contact LX. Thus, although switch BF operates to separate contacts BF1, contact LM remains in engagement with contact LX after the winch motor acceleration on eight pole excitation has been completed so that the circuit for the coil of auxiliary fast speed switch AF is not broken and the winch motor does not change over to fast speed operation.

Should the upward movement of master switch segment MS not be all the way, the winch motor will operate at a speed for the particular load determined by the position to which the master switch segment is moved. Assume for example that the master switch segment is moved only so far as contact MU5. Under such conditions change-over from normal to fast speed operation cannot be made regardless of the load being lifted. If the master switch segment is moved only so far as contact MU4, accelerating switch DA is not operated so that a portion of rotor resistance RR is not short-circuited, thereby causing the motor to run at a slower speed. A similar condition exists if the master switch segment is moved only so far as contacts MU3, MU2 or MU1. Also the motor may be slowed down by moving the master switch segment off the stationary contacts in one or more steps in which case, as above explained, the speed of the winch motor will be determined by the farthest contact with which the master switch segment is engaged.

While the winch motor may be slowed down and stopped in steps, the usual practice is to return the master switch segment directly to off position. Assume that the master switch segment has been moved into full up position engaging contact MU6 and that the hook is empty, so that the winch motor is operating at fast speed. The fast speed switch, upon operation to connect stator winding MST for four pole excitation, also engaged contacts FS4 completing a circuit for the coil of auxiliary fast speed switch CF. Switch CF, upon operation, engages contacts CF3 to complete a circuit for the coil of down accelerating fast speed switch DF. Switch CF also engages contacts CF1 to establish a holding circuit for the coil of up direction switch U, by-passing the master switch. Thus upon return of the master switch segment to off position switch U is maintained operated.

The disengagement of the master switch segment from contacts MU6 as the master switch segment is returned to off position breaks the circuit for the coils of auxiliary fast speed switch BF and fast speed switch FS. Switch BF, upon dropping out, engages contacts BF1 to reestablish a circuit for auxiliary fast speed switch AF. Switch AF engages contacts AF3 which together with the reengagement of contacts FS6 of the fast speed switch reestablishes the circuit for the coil of normal speed switch NS. Thus with the fast speed switch dropped out to separate contacts FS1, FS2 and FS3, the normal speed switch operates to reengage contacts NS1, NS2, NS3 and NS4, thereby restoring the circuits for winch motor stator winding MST to provide eight pole excitation. As a result the winch motor is slowed down by regenerative braking. Switch AF also engages contacts AF1 which, owing to the fact that contacts DF1, DF2, DF3 and DF4 are now engaged, causes the reoperation of accelerating switches AA, BA, CA and DA in sequence, short-circuiting rotor resistance RR in steps to give the desired slow down torque.

The fast speed switch, upon dropping out, also separates contacts FS4 to break the circuit for the coil of auxiliary fast speed switch CF. This switch does not drop out immediately, the discharge or condenser C3 into the coil of the switch delaying the dropping out long enough to permit slowing down of the winch motor to normal speed operation. Upon dropping out, switch CF separates contacts CF3 to break the circuit for the coil of down auxiliary fast speed switch DF, causing this switch to drop out. It also separates contacts CF1, breaking the circuit for the coil of up direction switch U (this circuit being broken by the return of the master switch to off position in case the motor had not been operating at fast speed). The up direction switch in dropping out, separates contacts U3, the coil of auxiliary direction switch Z being maintained sufficiently energized by way of the circuit through resistance R10 to cause this switch to remain operated. The up direction switch also engages contact U4 which completes a circuit for the coils of auxiliary governor switch relay SA and down direction switch D. This circuit is through contacts DA4, CA5 and BA5 now engaged as a result of the dropping out of switch DF (or by return of the master switch to off position in case the motor had not been operating at fast speed), coil of relay SA, contacts Z2, coil of switch D and contact U4. As a result, relay SA and switch D operate. Switch D, upon operation, separates interlock contacts D3 in the circuit for the coil of up direction switch U. It also separates contacts D4 in the circuit for the coil of normal speed switch NS. The circuit for the coil of switch NS is maintained established through contacts Z4 after the separation of contacts U3. Switch D also engages contacts D5 to reestablish the circuit for the coil of brake relay BR, broken by the separation of contacts U5, this relay being maintained operated by the discharge of condenser C7 into its coil during the interval that its circuit is broken. Switch U, upon dropping out, also separates contacts U1 and U2 in the circuits for stator winding MST of the winch motor. However, contacts D1 and D2 engage to reestablish the circuits for stator winding MST for eight pole excitation, but reversing the connections to the stator winding from supply lines II and III. This plugs the winch motor, causing further slow down.

Auxiliary governor switch relay SA, upon operation, engages contacts SA1 completing a circuit through contacts NS5 for the coil of governor switch relay S. Relay S, upon operation, separates contacts S2 and S3 and engages contacts S1 and S4. This not only renders the coil of governor switch G subject to the portion of potentiometer resistance R3 to the right of point 126 but also reverses the circuit for this coil. As a result of the reversal of the excitation of stator winding MST of the winch motor in plugging the motor the voltage across the slip rings of the phase wound winding of the rotor is increased substantially to twice standstill voltage for eight pole excitation of the motor. As a result the resistance drop across potentiometer resistance R4 is greater than that across the now used portion of resistance R3, thereby reversing the polarity of the voltage applied to the coil of governor switch G. By reversing the circuit for the coil of switch G the current flow through this coil is in the same direction through contacts S1 and S4 as it was through contacts S2 and S3 so that switch G does not drop out, switch G being maintained operated during the change of connections by the discharge into its coil of condenser C2.

As the winch motor slows down, the voltage across the slip rings of the rotor decreases with the result that the voltage applied to the coil of switch G decreases. As the voltage drop across the now used portion of resistance R3 is neutralized by the voltage drop across resistance R4 at standstill on eight pole excitation, the voltage applied to the coil of switch G becomes zero as the rotor comes to a stop. Relay G drops out just before the voltage across its coil drops to zero, separating contacts G1. This breaks the circuit for the coil of switch Z, causing this switch to drop out. Upon dropping out, it separates contacts Z2 breaking the circuit for the coils of switch D and relay SA. Switch D, upon dropping out, separates contacts D1 and D2 to deenergize stator winding MST of the winch motor and also separates contacts D5 to break the circuit for the coil of brake relay BR. As contacts G2 are now separated, relay BR drops out immediately. Relay BR, upon dropping out, separates contacts BR3 to break the circuit for the release coil of electromechanical brake B. Thus, the brake is applied to bring the winch motor to a stop. The brake relay also separates contacts BR4 to break the circuit for the coil of normal speed switch NS which drops out. The separation of contacts BR4 also breaks the circuit for the coil of switch G. In the meantime, as the result of the separation of contacts SA1 of the auxiliary governor switch relay, auxiliary governor switch S drops out to restore its contacts in circuit with the coil of switch G to the positions illustrated.

To lower the hook, master switch segment MS is moved downwardly to bridge contacts MD1, MD2 and MD3 with feed contact MDF. As in the case of raising the hook, the master switch segment may be moved all the way over or only to an intermediate position. Assume first that the master switch segment is initially moved all the way over to bridge contacts MD1, MD2 and MD3 with contact MDF. The bridging of contacts MDF and MD1 completes a circuit for the coil of down direction switch D. This circuit is through contacts Z1, contacts MDF and MD1, contacts Z3, resistance R12, contacts X4, coil of switch D, and contacts U4. The down direction switch, upon operation, engages contacts D1 and D2 to establish direction for the winch motor for downward hook movement and engages contacts D5 to complete the circuit for the coil of brake relay BR. The bridging of contacts MDF and MD2 completes a circuit for the coil of down auxiliary fast speed switch DF. Switch DF, upon operation, separates contacts DF6 to prevent the energization of the coil of slow speed switch SS. It also engages contacts DF8 so that, although contacts D4 separate, the engagement of contacts BR4 completes a circuit for the coil of normal speed switch NS. Switch NS engages contacts NS1, NS2, NS3 and NS4 to complete a circuit for stator winding MST to provide eight pole excitation of the winch motor as previously described. At the same time relay BR engages contacts BR3 to cause energization of the release coil of the electromechanical brake. Thus, the brake is released and the winch motor is started in the direction to lower the hook. Switch DF, upon operation, also engages contacts DF1, DF2, DF3 and DF4 which, as previously described, causes the operation of accelerating switches AA, BA, CA and DA in sequence. This causes the short-circuiting in steps of rotor resistance RR to cause the motor to operate at normal full speed.

Switch DF, upon operation, also engages contacts DF5 which completes a circuit for the coil of auxiliary direction switch X. This circuit is through contacts Z1, coil of switch X, contacts DF5, contacts CF2 and contact G1, switch G being operated as a result of the engagement of contacts BR4, as previously described. Switch X, upon operation, separates contacts X4 in the circuit for the coil of down direction switch D, this coil being maintained energized, however, through contacts DF7 of the down auxiliary fast speed switch.

Switch DA, upon operation to short-circuit the remaining portion of rotor resistance RR, also engages contacts DA5 to complete a circuit from master switch contact MD3 for the coil of auxiliary fast speed switch BF. Switch BF, upon operation, separates contacts BF1 in the circuit for the coil of auxiliary fast speed switch AF. Assuming that the hook is empty, upon the winch motor coming up to full speed, the load switch contact LM is disengaged from a stationary contact so that the circuit for the coil of auxiliary fast speed switch AF is broken. Upon dropping out, switch AF breaks the circuit for the coils of the accelerating switches and for the coil of normal speed switch NS, as previously described. Switch NS, upon dropping out, breaks the circuits for causing eight pole excitation by stator winding MST. At the same time it engages contacts NS7 to complete a circuit for the coil of fast speed switch FS which operates as previously described to engage contacts FS1, FS2 and FS3 to reconnect stator winding MST to supply lines to cause four pole excitation of the winch motor. This brings the motor from normal operating speed up to fast speed.

Assume that instead of the hook being empty it has a heavy load. This is an over-hauling load on the winch motor, causing it to pump back into the supply lines to maintain its speed slightly above synchronous speed for eight pole excitation. Due to the over-hauling load the load switch rotor is rotated in the opposite direction to that for lifting a heavy load. In accordance with the previous assumption, it will cause contact LM to be engaged with stationary contact LY. Thus although switch BF operates to separate contact BF1, contact LM remains in engagement with contact LY after the winch motor acceleration on eight pole excitation has been completed so that the circuit for the coil of auxiliary fast speed switch AF is not broken and the winch motor does not change over to fast speed operation.

Should master switch segment MS be moved only so far as contact MD2 in starting the motor, the circuit for the coil of switch BF is not completed so that change-over from normal to fast speed operation cannot be made regardless of the load being lowered. The winch motor is not normally started to lower the hook from a high position by moving the master switch segment only into its first operative position bridging contact MD1 with contact MDF, this operative position being provided for inching the load as it is about to be landed.

While the winch motor during downward movement of the hook may be slowed down and stopped in steps, it will be assumed that the master switch segment is returned directly to off position. Assume first a condition in which the hook is empty and the winch motor is operating at fast speed. Under such conditions, auxiliary fast speed switch CF is operated, as previously described, so that contacts CF3 are in engagement to maintain the coil of down direction fast speed switch energized with the master switch segment in off position. The coil of switch X is energized through resistance R11 after the separation of contacts CF2, maintaining the switch operated. The disengagement of the master switch segment from contact MD3 breaks the circuit for the coils of auxiliary fast speed switch BF and fast speed switch FS. This results in the reoperation of switch AF and switch NS to restore the circuits for winch motor stator winding MST to provide eight pole excitation, as previously described. As a result, the winch motor is slowed down by regenerative braking. Also the accelerating switches are reoperated, as previously described, to provide the required slow down torque.

Upon the dropping out of switch CF after the breaking of its circuit by the separation of contacts FS4 and the discharge of condenser C3 sufficiently to permit the switch to drop out, contacts CF3 separate to break the circuit for the coils of switches DF and D. Switch D, upon dropping out, engages contacts D3 completing a circuit for the coils of relay SA and switch U. This circuit is through contacts DA4, CA5, BA5, coil of relay SA, contacts X3, coil of switch U and contacts D3. Switch D also separates contacts D1 and D2 in the circuits for stator winding MST. However, contacts U1 and U2 engage to reestablish the circuits for stator winding MST, but reversing the connections from supply lines II and III. This plugs the winch motor causing further slow down. Relay SA operates, as previously described, to render through the operation of relay S the coil of governor switch G subject to the voltage of the phase wound rotor winding. As the rotor winding voltage approaches zero, switch G drops out to break the circuit for the coil of switch X which in turn drops out separating contacts X3 to break the circuit for the coils of relay SA and switch U. Switch U, upon dropping out, separates contacts U1 and U2 to deenergize stator winding MST and also separates contacts U5 to break the circuit for the coil of relay BR. Relay BR, upon dropping out, causes deenergization of the electromechanical brake so that the brake is applied to bring the winch motor to a stop.

When the winch motor is lowering a loaded hook it is usually desirable to effect a landing of the load either on a platform at the wharf or at one of the ship's decks. In such event, while the master switch segment may be centered and then moved back into position to engage contact MD1 for an inching operation after the winch motor comes to a stop, it is preferred to move the master switch segment into position so that it remains in engagement with contact MD1 but is off contacts MD2 and MD3. Under such conditions, assume that the winch motor is operating at normal speed due to the fact that the hook has a heavy load. Switch CF is not operated so that the disengagement of segment MS from contact MD2 breaks the circuit for the coils of switches DF and D. Switch D, upon dropping out, breaks the circuit for stator winding MST and at the same time causes operation of switch U to establish reverse connections for stator winding MST to plug the motor, as previously described. Also relay SA is operated, as previously described, to render through the operation of relay S the coil of switch G subject to the voltage of the phase wound rotor winding. As the rotor winding voltage approaches zero, switch G drops out to break the circuit for the coil of switch X which in turn drops out to break the circuit for the coils of relay SA and switch U. Switch X also reengages contacts X4 which reestablishes the circuit from contacts MD1 of the master control switch for the coil of switch D. Switch D, upon operation, separates contacts D4 breaking the circuit for the coil of normal speed switch NS which drops out to engage contacts NS6 completing a circuit from contact MD1 of the master switch for the coil of slow speed switch SS. Thus, as up direction switch U and normal speed switch NS drop out to break the circuits for stator winding MST, down direction switch D and slow speed switch SS operate to engage contacts D1, D2, SS1 and SS2, establishing the circuits for slow speed stator winding MSS for down direction of hook movement, thereby causing the hook to run at slow speed preparatory to landing the cargo. As the cargo lands, master switch segment MS is moved to off position which breaks the circuit for the coils of switches D and SS with the result that the circuits for the winch motor are broken and the brake is applied to bring the winch motor to a stop, contacts SS5 preventing delay in the dropping out of relay BR.

If during operation, the master switch is thrown from one operative position to another, the control system operates automatically to cause slow down of the motor and to start it in the opposite direction as it comes to a stop. Assume, for example, that the hook is being lifted and that the motor is operating at fast speed. Should the master switch segment MS be moved from position engaging contact MU6 to position engaging contact MD3, the circuit for the coils of switches BF and FS is broken as the master switch segment is disengaged from contact MU6. Upon engagement of the segment with contact MD3 the circuit for these coils is not reestablished as contacts DA5 are separated preventing the energization of the coil of switch BF and as contacts BF2 and AF2 are separated preventing the energization of the coil of switch FS, switch AF being operated as the result of the engagement of contacts BF1. The engagement of contacts FS6 and AF3 complete a circuit for the coil of switch NS which establishes eight pole excitation of the motor to cause the motor to slow down by regenerative braking as previously described. Upon the dropping out of switch CF, switches DF and U are deenergized. This results in the operation of relay SA and switch D. Switch D acts to reverse the excitation of the motor, plugging the motor to cause further slow down. As the speed of the motor approaches zero, switch G drops out breaking the circuit for the coil of switch Z. Switch Z engages contacts Z1 and Z3 to establish another circuit for the coil of switch D, the engagement of contacts Z1 causing reoperation of switch DF. Thus the motor is caused to reverse and start in the down direction whereupon it is brought up to fast speed in the manner previously described. The operation of the system in case the master switch segment is moved from full down to full up position is similar and it is believed that this operation will be understood from the above description.

In review of the operation of the system, the hook may be raised by moving the master switch in the up direction. This causes the winch motor to start on eight pole excitation. Assuming that the master switch is moved to full on position, the rotor resistance is short-circuited in steps, this being the running condition of the motor circuits if a heavy load is being lifted. If the load is light, as the motor comes up to full speed on eight pole excitation it is automatically transferred to four pole excitation to double the operating speed. If the movement of the master switch in the up direction is short of full on position, the motor runs on eight pole excitation regardless of load. The speed of the motor on eight pole excitation may be varied by moving the master switch segment to different positions. Upon returning the master switch to off position to bring the motor to a stop, if operating at fast speed, the motor is first restored to eight pole excitation to cause slow down by regenerative braking. Then the excitation is reversed to plug the motor, causing further slow down. As the speed of the motor approaches zero, excitation of the motor is discontinued and the electromechanical brake is automatically applied to bring the motor to a stop.

The hook may be lowered by moving the master switch in the opposite direction. Assuming that it is moved to full on position, the winch motor starts on eight pole excitation and the rotor resistance is automatically short-circuited in steps. If the load on the hook is heavy, the motor remains on eight pole excitation, the over-hauling load causing the motor to pump back into the supply lines to maintain the speed slightly above synchronous speed. If the load is light, as the motor comes up to full speed on eight pole excitation it is automatically transferred to four pole excitation to double the operating speed. The master switch may be moved only to the second position if desired in which event the motor will operate on eight pole excitation regardless of the load on the hook. Upon returning the master switch to its first operating position, if operating at fast speed, the motor is first restored to eight pole excitation to cause slow down by regenerative braking. Then the excitation is reversed to plug the motor, causing further slow down. As the speed of the motor approaches zero, it is automatically transferred to thirty-six pole excitation to provide slow speed for inching in the down direction. As the load is landed, the master switch is returned to off position whereupon the electromechanical brake is applied to bring the motor to a stop. The master switch instead of being returned to its first operating position may be returned directly to off position. Then if it is desired to inch, the master switch is returned to the first position as the motor comes to a stop.

Thus it is seen that a control system is provided in which the winch motor may be operated at normal speed in either direction regardless of load and at fast speed in either direction if the load is light. Also the motor may be operated at slow speed in the down direction for inching. This minimizes the size of the motor. While the system might be arranged to permit operation at slow speed in the up direction when the load does not exceed a certain value, as for taking up slack in the roping, eliminating slow speed operation entirely in the up direction in accordance with the arrangement shown is satisfactory and simplifies the system.

It is to be understood that the speeds of the motor are dependent upon the requirements of the particular installation and that the ratios of the various speeds may vary. In the arrangement of motor which has been described, variation of speed ratios may be effected by varying the ratios of pole numbers. By utilizing ratios of pole numbers such that the number of poles for slow speed excitation is an odd multiple of that for fast speed excitation but not a multiple of that for normal speed excitation and that the number of poles for normal speed excitation is an even multiple of that for fast speed excitation, the phase wound rotor winding will be effective only for normal speed excitation and the squirrel cage winding will be effective only for fast and slow speed excitations. Although in the optimum arrangement full pitch rotor windings are provided, one or both windings may be fractional in pitch so long as this does not cause objectionable current flow in the winding when operating on the excitation for the other winding. The different pole numbers of stator excitation may be obtained in ways other than that described. Motors of other numbers of phases may be employed and either star or mesh connections may be utilized. The control system may be employed to control other types of hoisting motors, including various types of alternating current motors and direct current motors, as for example those supplied with current from variable voltage direct current generators. The control system may be employed to control the operation of hoisting motors other than those used as cargo winch motors and certain features of the control system are applicable to the control of various types of industrial motors. Also the motor may be utilized for other types of hoists and may also be used for other types of industrial applications.

Various features of the invention are applicable to various types of systems. For example, the governor switch arrangement and the load switch arrangement may be adapted to various forms of motor control systems. Also variations may be made in the governor switch arrangement utilized in the control system shown. Further, other types of load responsive mechanism may be employed.

Thus, as many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A control system for a multi-speed electric motor for lifting and lowering load carrying means comprising, a switch manually operable in either direction from off position and having a running position in one direction, a running position in the other direction and an inching position in said other direction only, means responsive to said switch in running position in said one direction for causing operation of said motor to lift said load carrying means at a certain speed and responsive to said switch in running position in said other direction for causing operation of said motor to lower said load carrying means at said certain speed, said switch responsive means including means responsive to the load carried by said load carrying means during either upward or downward movement thereof being below a certain amount to cause operation of said motor to move said load carrying means at a higher speed than said certain speed, and means responsive to said switch in said inching position for causing operation of said motor to lower said load carrying means at a lower speed than said certain speed.

2. A control system for a multi-speed polyphase alternating current hoisting motor comprising, a source of polyphase alternating current for said hoisting motor, means for connecting said hoisting motor to said source, means for controlling the running speed of said hoisting motor, a torque motor having two exciting windings, one connected in series with one of the supply lines from said source to said hoisting motor and the other subject to the voltage applied thereto, and circuit controlling means operable by said torque motor for controlling said speed controlling means to cause said hoisting motor to run at a certain one of its speeds when the torque on said torque motor is above a certain amount and to cause said hoisting motor to run at a faster speed when the torque on said torque motor is below said certain amount.

3. A control system for a multi-speed three-phase induction motor comprising, a source of three-phase alternating current for said induction motor, means for connecting said hoisting motor to said source, means for controlling the running speed of said induction motor, a two-phase torque motor having one exciting winding in series with one of the supply lines from said source to said induction motor and the other subject to the voltage applied to the induction motor, and circuit controlling means operable by the rotor of said torque motor for controlling said speed controlling means to cause said induction motor to run at a certain one of its speeds when the load thereon is positive and above a certain amount or negative and above a certain amount and to cause said induction motor to run at a faster speed when the load is less than said certain amount of positive load or less than said certain amount of negative load.

4. A control system for a three-phase induction motor comprising, a source of three-phase alternating current for said induction motor, means for connecting said induction motor to said source, an impedance connected across two of the supply lines from said source to said induction motor, a two-phase torque motor having one exciting winding in series with the other of said supply lines and the other exciting winding connected across said other supply line and a point on said impedance, and circuit controlling means operable by the rotor of said torque motor for controlling the operation of said induction motor.

5. A control system for a multi-speed three-phase induction motor comprising, a source of three-phase alternating current for said induction motor, means for connecting said induction motor to said source, means for controlling the running speed of said induction motor, a potentiometer resistance connected across two of the supply lines from said source to said induction motor, a two-phase torque motor having one exciting winding in series with the other of said supply lines and the other exciting winding connected across said other supply line and a point on said resistance, and circuit controlling means operable by the rotor of said torque motor for controlling said speed controlling means to cause said induction motor to run at different ones of its speeds dependent upon the load thereon.

6. A control system for a multi-speed three-phase induction motor having its stator wound to provide two different pole numbers of excitation comprising, a source of three-phase alternating current for said induction motor, means for controlling the connections of said stator to said source to provide said different pole numbers of excitation, a potentiometer resistance connected across two of the supply lines from said source to said stator, a two-phase torque motor having one exciting winding in series with the circuit connecting the other of said supply lines to said stator for the higher pole number of excitation and the other winding connected across said other supply line and a point on said resistance, and circuit controlling means operable by the rotor of said torque motor for controlling said excitation controlling means to cause said stator to be connected for the higher pole number of excitation when the load on said induction motor is above a certain amount and operable when said load is below said certain amount to cause said stator to be connected to provide the lower pole number of excitation.

7. A control system for a multi-speed three-phase induction motor having its stator wound to provide two different pole numbers of excitation comprising, a source of three-phase alternating current for said stator, means for controlling the connections of said stator to said source to provide said different pole numbers of excitation, a potentiometer resistance connected across two of the supply lines from said source to said stator, a two-phase torque motor having one exciting winding in series with the circuit connecting the other of said supply lines to said stator for the higher pole number of excitation and the other winding connected across said other supply line and a point on said resistance, said point being such that the currents in said windings are substantially in phase when the load on said induction motor is light, and circuit controlling means operable by the rotor of said torque motor for controlling said excitation controlling means to cause said stator to be connected for the higher pole number of excitation when the current in said series winding is more than a certain amount out of phase with the current in said other winding and to be connected for the lower pole number of excitation when the current in said series winding becomes less than said certain amount out of phase with the current in said other winding.

8. A control system for a multi-speed three-phase induction motor having its stator wound to provide three different pole numbers of excitation and being adapted to raise and lower load carrying means comprising, a source of three-phase alternating current for said stator, means for controlling the connections of said stator to said source to provide said different pole numbers of excitation, a potentiometer resistance connected across two of the supply lines from said source to said stator, a two-phase torque motor having one exciting winding in series with the circuit connecting the other of said supply lines to said stator for only the medium pole number of excitation and the other winding connected across said other supply line and a point on said resistance, said point being such that the currents in said torque motor windings are substantially in phase when the load carried by said load carrying means is light, circuit controlling means operable by the rotor of said torque motor for controlling said excitation controlling means to cause for either direction of movement of said load carrying means said stator to be connected for the medium pole number of excitation when the current in said series winding is out of phase with the current in said other winding more than a certain amount and to be connected for the low pole number of excitation when the current in said series winding becomes out of phase with the current in said other winding less than said certain amount, and means operable to control said excitation controlling means to cause for downward movement of said load carrying means said stator to be connected for the high pole number of excitation unaffected by said circuit controlling means.

JACOB DANIEL LEWIS.